United States Patent
Hanada et al.

(10) Patent No.: US 8,276,628 B2
(45) Date of Patent: Oct. 2, 2012

(54) NON-PNEUMATIC TIRE

(75) Inventors: Ryoji Hanada, Hiratsuka (JP); Hideki Seto, Hiratsuka (JP); Yoshiaki Hashimura, Hiratsuka (JP); Jun Matsuda, Hiratsuka (JP); Tsuyoshi Kitazaki, Hiratsuka (JP); Izumi Kuramochi, Hiratsuka (JP); Kenichirou Endo, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/368,025

(22) Filed: Feb. 9, 2009

(65) Prior Publication Data
US 2009/0211674 A1    Aug. 27, 2009

(30) Foreign Application Priority Data
Feb. 25, 2008   (JP) .................. 2008-043329

(51) Int. Cl.
*B60B 9/00*    (2006.01)
*B60C 5/00*    (2006.01)
(52) U.S. Cl. ............... 152/34; 152/11; 152/157
(58) Field of Classification Search .......... 152/5, 6, 152/7, 8, 11, 12, 30, 34, 323–328, 333.1, 152/338.1, 155, 157, 159, 165
See application file for complete search history.

(56) References Cited

U.S. PATENT DOCUMENTS

| | | | | |
|---|---|---|---|---|
| 468,971 A * | 2/1892 | Myers | ............................ | 152/325 |
| 927,477 A * | 7/1909 | Barker | ......................... | 152/338.1 |
| 1,233,126 A * | 7/1917 | Prieto et al | ............... | 301/64.302 |
| 1,233,143 A * | 7/1917 | Teresa | .......................... | 152/333.1 |
| 1,258,573 A * | 3/1918 | Johnstone | ......................... | 152/7 |
| 1,365,539 A * | 1/1921 | Pepple | ............................. | 152/48 |
| 1,404,059 A * | 1/1922 | Reid et al. | ........................ | 152/52 |
| 1,443,258 A * | 1/1923 | Granat | ........................ | 152/338.1 |
| 1,456,775 A * | 5/1923 | Hicks | ............................... | 152/328 |
| 1,460,783 A * | 7/1923 | Bauman | ............................... | 152/6 |
| 1,494,797 A * | 5/1924 | Nimschke | ....................... | 152/308 |
| 1,624,856 A * | 4/1927 | Bauman | ......................... | 152/247 |
| 1,841,773 A * | 1/1932 | Worsley et al. | ............... | 152/328 |
| 2,208,670 A * | 7/1940 | Gamboa | ......................... | 152/159 |
| 2,253,230 A * | 8/1941 | Feldman | ................... | 152/338.1 |
| 2,620,845 A * | 12/1952 | Lord | ............................. | 152/328 |
| 3,438,419 A * | 4/1969 | Barbera | ..................... | 152/338.1 |
| 4,235,270 A * | 11/1980 | Kahaner et al. | ................... | 152/7 |
| 4,921,029 A * | 5/1990 | Palinkas et al. | ................. | 152/11 |
| 4,945,962 A * | 8/1990 | Pajtas | ................................. | 152/7 |
| 5,343,916 A * | 9/1994 | Duddey et al. | .................... | 152/5 |
| 5,460,213 A * | 10/1995 | Pajtas | ............................. | 152/11 |
| 5,520,232 A * | 5/1996 | Fukutake et al. | ............. | 152/267 |
| 6,050,312 A * | 4/2000 | Hsu | ................................. | 152/157 |
| 6,269,855 B1* | 8/2001 | Elgendi | ..................... | 152/333.1 |
| 2009/0173421 A1* | 7/2009 | Love et al. | .................... | 152/246 |

FOREIGN PATENT DOCUMENTS
WO    WO 03/018332 A1    3/2003

* cited by examiner

*Primary Examiner* — Jason Bellinger
(74) *Attorney, Agent, or Firm* — Greer, Burns & Crain, Ltd.

(57) ABSTRACT

Provided is a non-pneumatic tire in which buckling can be prevented without a weight increase, the non-pneumatic tire including a spoke structure. The spoke structure is obtained by circumferentially arranging spokes intermittently at intervals and coupling together annular cylindrical outer member and cylindrical inner. The spoke structure is joined to an inner peripheral side of a tread ring. At least some of a plurality of spaces formed between two spokes adjacent to each other in the tire circumferential direction have an air-containing structure.

15 Claims, 6 Drawing Sheets

NON-PNEUMATIC TIRE

FIELD OF THE INVENTION

The present invention relates to a non-pneumatic tire. More specifically, the present invention relates to a non-pneumatic tire including a spoke structure and being capable of preventing buckling from occurring without an associated increase in weight.

DESCRIPTION OF THE PRIOR ART

Conventionally, as non-pneumatic tires, a solid tire, a cushion tire and the like having a solid rubber structure, have been mainly used for industrial vehicles. However, the conventional non-pneumatic tires are heavy in weight, and lack a shock absorbing characteristic, and therefore, have not been adopted for application to passenger vehicles, in which ride comfort performance is considered important.

In order to improve ride comfort performance of the above described non-pneumatic tires, and thereby to make them adoptable for application to passenger vehicles, there has been proposed a non-pneumatic tire T, as shown in FIG. 9, achieving weight reduction and the shock absorbing characteristic by interposing a spoke structure 2 between a tread ring 1 and a wheel 20, the spoke structure 2 having a cylindrical outer member 3 and a cylindrical inner member 4 coupled to each other with a large number of spokes 5 radially arranged therebetween at a constant pitch in the tire circumferential direction (for example, refer to International Publication WO 2003/018332 Pamphlet).

However, in this non-pneumatic tire T, there is a space between any circumferentially adjacent ones of the spokes 5 in the spoke structure 2, whereby rigidity of the cylindrical outer member 3 becomes low in a region between those spokes 5. For this reason, a tread portion, of the non-pneumatic tire T, which is supported by the cylindrical outer member 3 when the tire makes contact with the ground, suffers buckling between those spokes 5 in some cases, and the buckling tends to conspicuously occur in a center region of the tire in the tire width direction. If this buckling phenomenon occurs repeatedly at every rotation of the tire, not only vibration and abnormal wear in a tread ring are caused, but it eventually leads to destruction of the tire.

As a countermeasure against this buckling, Japanese Patent No. 3966895 proposes a non-pneumatic tire in which, with a spoke structure being divided in the tire width direction into a plurality of separate structures, circumferential positions of spokes in one structure of the separate structures are made shifted in the tire circumferential direction from those in another structure adjacent to the one structure. However, even in this non-pneumatic tire, it is difficult to completely prevent buckling in some cases such as when a large load acts upon the tire. Moreover, if a countermeasure against the buckling, such as increasing the number of spokes, or thickening a tread, is taken, it leads to weight increase thereof. For these reasons, this non-pneumatic tire is not necessarily considered as a satisfactory countermeasure.

SUMMARY OF THE INVENTION

An object of the present invention is to provide a non-pneumatic tire in which buckling can be prevented without an associated increase in weight, the non-pneumatic tire including a spoke structure.

A non-pneumatic tire of the present invention for achieving the above object is a non-pneumatic tire in which a spoke structure is joined to an inner peripheral side of a tread ring, the spoke structure having spokes arranged intermittently at intervals in a tire circumferential direction so as to couple an annular cylindrical outer member and a cylindrical inner member to each other, in which at least some of a plurality of spaces each formed between adjacent two of the spokes in the tire circumferential direction have an air-containing structure.

It is preferable that the plurality of spaces each formed between adjacent two of the spokes in the tire circumferential direction be each structured to have further divided spaces in the tire radial direction, and each of the spaces located outermost, in the tire radial direction, among the spaces obtained by the division have an air-containing structure. Additionally, it is preferable that the air-containing structure be obtained by forming sealing walls on both sides of each of the spaces in a tire width direction.

It is preferable that the air-containing structure be obtained by press fitting into the space an elastic bag body having air sealed therein. It is preferable that the elastic bag body include an air charging and discharging valve, and, the elastic bag body may communicate with another elastic bag body adjacent thereto through an air charging and discharging tube, and this air charging and discharging tube may be connected with the air charging and discharging valve.

It is preferable that sealing walls be formed on both sides of the elastic bag body in the tire width direction, and that a cross-sectional height of each of the sealing walls be set to 30 to 80% of a cross-sectional height of each of the spokes. Additionally, it is preferable that, the spokes be bent so as for resulting concave faces of two spokes to circumferentially face each other, and the elastic bag body be press fitted into a space between the two spokes forming these concave faces, the two spokes circumferentially forming a pair.

It is preferable that an air pressure in each of the spaces containing air be set higher than an atmospheric pressure, and that a gauge pressure of the air pressure in each of the spaces containing air be set to 10 to 500 kPa.

It is preferable that, a set of spaces in the spoke structure be further divided into a plurality of zones in the tire width direction, and a position of the space in one zone thereof be made shifted, in the tire circumferential direction, from a position of the space in another zone thereof adjacent to the one zone. Additionally, it is preferable that, the set of spaces in the spoke structure be further divided into at least three zones in the tire width direction, and at least a center zone in the tire width direction have an air-containing structure.

The non-pneumatic tire of the present invention is configured so that, in the spoke structure having spokes arranged intermittently at intervals in the tire circumferential direction, at least some of a plurality of spaces each formed between adjacent two of the spokes in the tire circumferential direction have an air-containing structure. Accordingly, when a load radially acts upon the cylindrical outer member, the air contained inside is compressed and rebounds, thereby dispersing the load acting upon the circumferential member. Consequently, buckling of the cylindrical outer member can be prevented. Moreover, there is no associated weight increase of the tire because this can be achieved without increasing the number of the spokes.

BEST MODES FOR CARRYING OUT THE INVENTION

Figure 1:
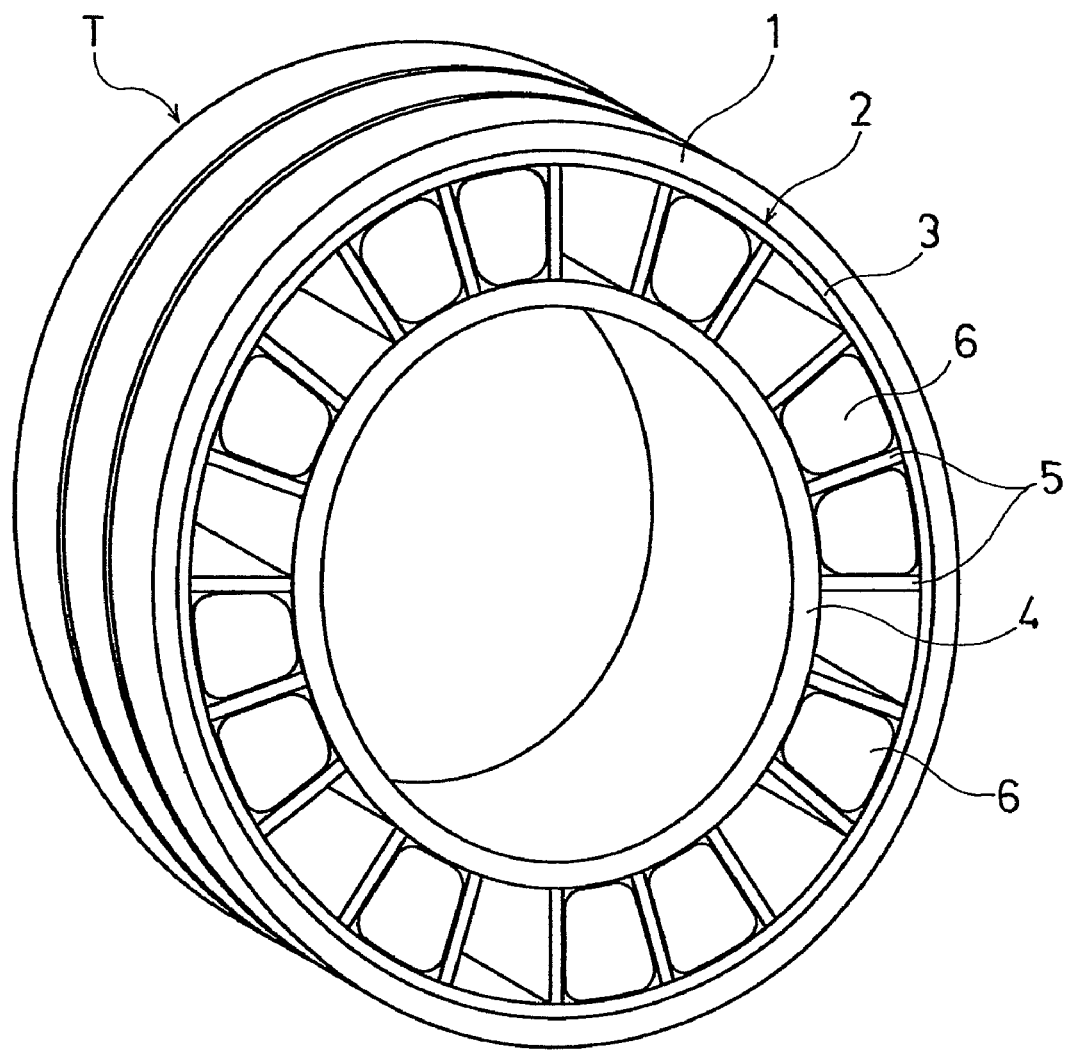
FIG. 1 is a perspective view showing examples of a tread ring and a spoke structure included in a non-pneumatic tire of the present invention.

As shown in FIG. 1, a non-pneumatic tire of the present invention includes a tread ring 1 and a spoke structure 2 joined to an inner peripheral side of the tread ring, and the spoke structure 2 has a large number of spokes 5 arranged radially between an annular cylindrical outer member 3 and a cylindrical inner member 4 at intervals in the circumferential direction, the spokes 5 coupling the cylindrical outer member 3 and the cylindrical inner member 4 together.

In this spoke structure 2, at least some of a plurality of spaces each formed between adjacent two, in the tire circumferential direction, of those spokes 5 each have an air-containing structure. In an illustrated example, this air-containing structure is obtained by press fitting, into a space between the two spokes 5, 5, an elastic bag body 6 having air sealed therein. There is no particular limitation as to the elastic bag body having air sealed therein, and, for example, a rubber bag body, a rubber ball, an urethane bag body and the like can be listed as examples. Note that what is employed for achieving such air-containing structure is not limited to this embodiment.

By this structure where some spaces each between adjacent two spokes 5, 5 in the tire circumferential direction contain air, the following is achieved. When a large load acts upon the cylindrical outer member 3 between these two spokes 5, 5, the air contained in the structure rebounds by being compressed, and consequently transmits a pressure evenly in all directions, thereby dispersing the load acting upon the cylindrical outer member 3. Consequently, buckling of the cylindrical outer member 3 can be prevented. In addition, this can be achieved without increasing the number of spokes, whereby there is no weight increase of the tire.

By the structure where the spaces each between adjacent two spokes 5, 5 in the tire circumferential direction contain air, it becomes possible to prevent spring constants in the tire radial direction from becoming circumferentially inconsistent, the spring constants being caused by ground-contacting faces when the tire travels. That is, in a conventional non-pneumatic tire, while a spring constant in the tire radial direction when a tread portion corresponding to a part having the spoke 5 vertically arranged makes contact with the ground is large, a spring constant in the tire radial direction when a tread portion corresponding to the space between the two spokes 5 makes contact with the ground is small. In the conventional non-pneumatic tire, when the tire travels, parts where the spokes are vertically arranged and parts corresponding to spaces between adjacent two of the spokes alternately make contact with the ground, and the spring constants in the tire radial direction consequently become inconsistent in the tire circumferential direction, whereby vibration and noise become large, and ride comfort is deteriorated. In contrast, in the non-pneumatic tire of the present invention, a difference in spring constant between a part where each of the spokes is vertically arranged and a part corresponding to a space between each adjacent two spokes is reduced because a space between each two spokes 5, 5 adjacent to each other in the tire circumferential direction is formed into an air-containing structure. Thereby, inconsistency in spring constant in the tire circumferential direction is reduced, i.e., differences in rigidity in the tire circumferential direction are reduced. As a result, vibration and noise when the tire travels are reduced, and ride comfort performance can be thereby enhanced.

Figure 2:
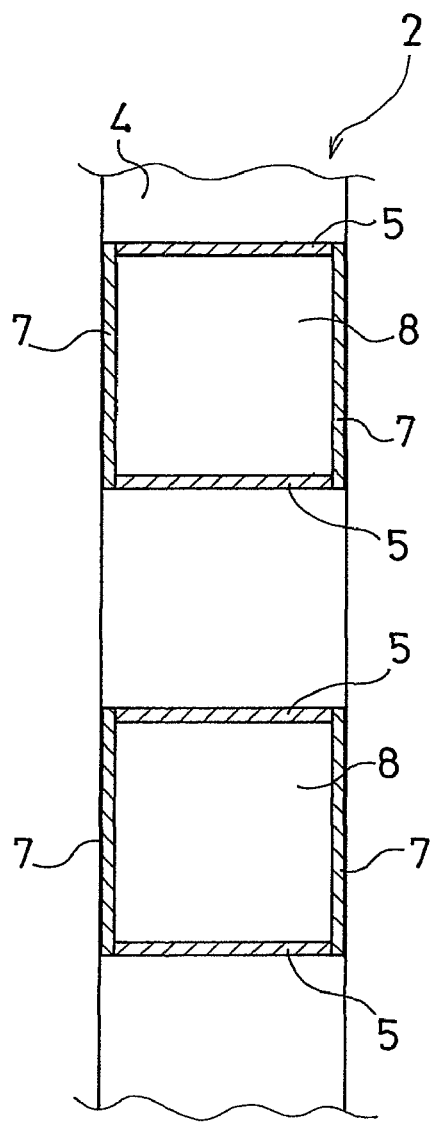
FIG. 2 is an explanatory view showing an example of the spoke structure constituting the non-pneumatic tire of the present invention in a state where the spoke structure with a cylindrical outer member removed therefrom is circumferentially developed.

FIG. 2 is an explanatory view showing an example of another embodiment of the non-pneumatic tire according to the present invention. In FIG. 2, sealing walls 7, 7 are provided on both sides, in the tire width direction, of the space between the two spokes 5, 5 adjacent to each other in the tire circumferential direction. Therefore, an airtight space 8 is formed by the cylindrical outer member 3, cylindrical inner member 4, spokes 5, 5 and sealing walls 7, 7. The air-containing structure is obtained by filling up the airtight space 8 with air. By forming the airtight space 8, a load acting on the cylindrical outer member 3 located on the outer side, in the tire radial direction, of the space containing air is dispersed evenly in all directions, whereby buckling can be prevented. Additionally, by reducing differences in tire rigidity in the tire circumferential direction, vibration and noise when the tire travels are reduced, and ride comfort performance can be thereby enhanced.

Figure 3:
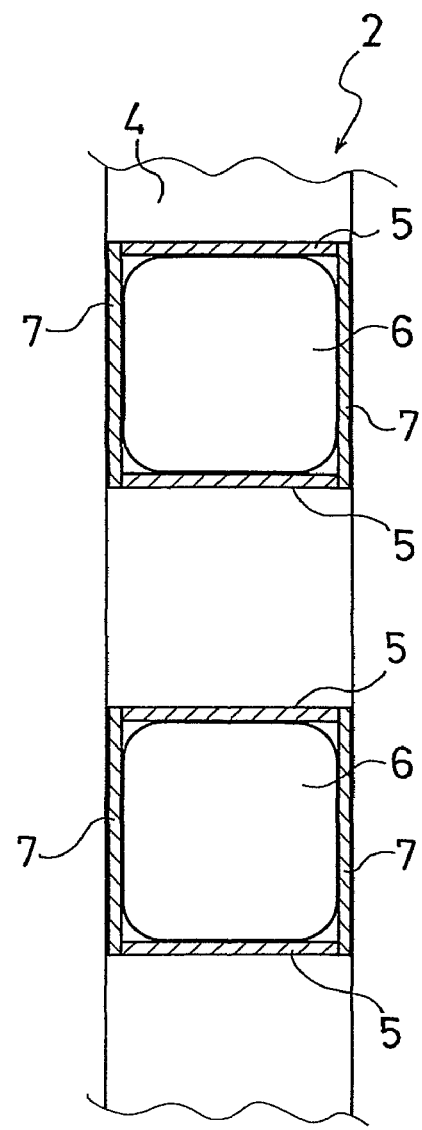
FIG. 3 is an explanatory view, which is equivalent to FIG. 2, showing another example of the spoke structure constituting the non-pneumatic tire of the present invention.

Likewise, as shown in FIG. 3, the sealing walls 7, 7 may be provided on both sides of the elastic bag body 6 in the tire width direction after the elastic bag body 6 having air sealed therein is press fitted into the space between the spokes 5, 5. Thereby, the sealing walls 7, 7 restrict deformation of the elastic bag body in the tire width direction, whereby a magnitude of rebound of the elastic bag body against compression thereof in the tire radial direction is made larger. Consequently, the cylindrical outer member 3 is hard to deform in the tire radial direction, whereby buckling prevention effect can be increased. Additionally, by reducing differences in rigidity in the tire circumferential direction, vibration and noise when the tire travels are reduced, and ride comfort can be thereby enhanced. While it is not necessary to particularly limit a cross-sectional height of the sealing walls, it is preferable that the cross-sectional height thereof be preferably set to 30% to 80% of a cross-sectional height of the spokes. By limiting the cross-sectional height of the sealing walls within this range, the magnitude of rebound of the elastic bag body 6 against compression thereof in the tire radial direction can be increased with weight increase of the tire being suppressed.

Figure 4:
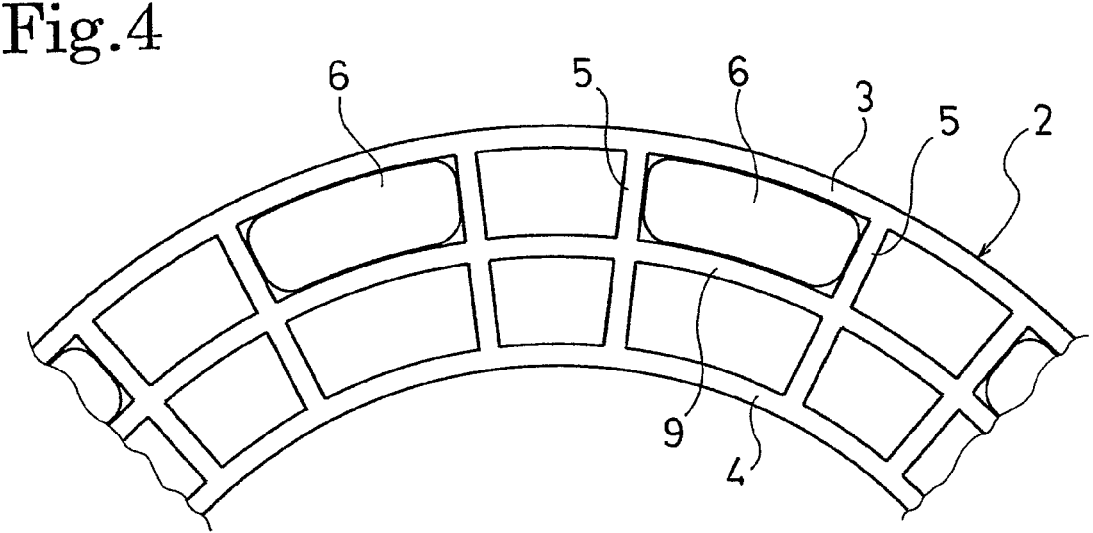
FIG. 4 is a side view partially showing an example of another embodiment of the spoke structure constituting the non-pneumatic tire of the present invention.

In another embodiment of the non-pneumatic tire according to the present invention, as shown in FIG. 4, a coupling portion 9 coupling together certain two spokes 5, 5 is formed, the two spokes 5 being adjacent to each other in the tire circumferential direction. This coupling portion 9 radially divides the space between those adjacent spokes 5, 5, and a space radially outermost among the spaces obtained by the division is formed into an air-containing structure by press fitting into the space the elastic bag body 6 having air sealed therein. By the structure where at least divided spaces located outermost in the tire radial direction contain air, the cylindrical outer member 3 between those spokes 5, 5 is efficiently prevented from deforming in the tire radial direction, and buckling can be prevented. Additionally, by making longer a distance between the adjacent spokes 5, 5 which corresponds to the space into which the elastic bag body 6 is press fitted, and making shorter a distance between adjacent two spokes which corresponds to a space into which the elastic bag body 6 is not press fitted, the total number of the spokes can be decreased, whereby the non-pneumatic tire can be reduced in weight.

Figure 5:
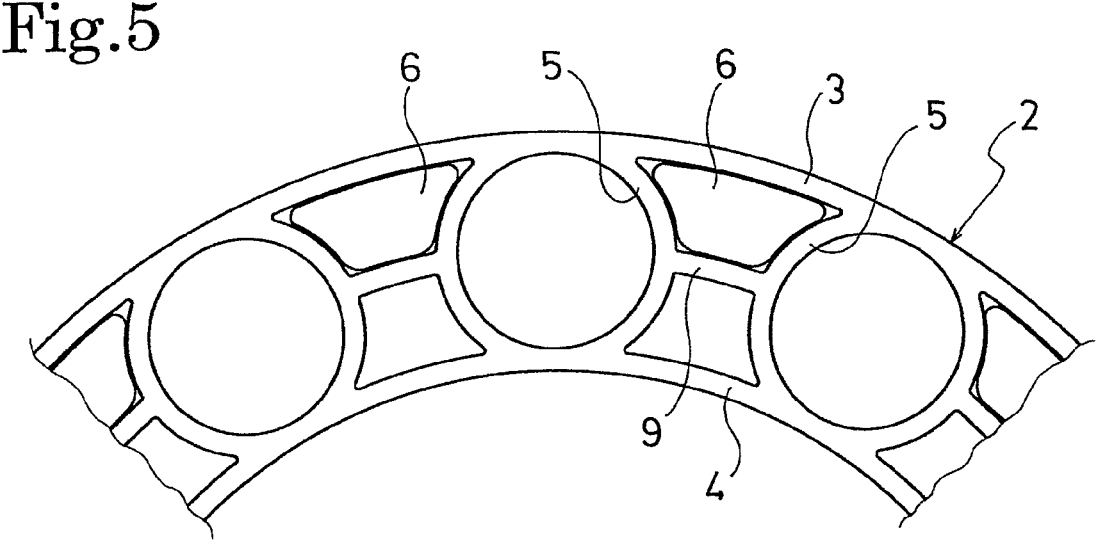
FIG. 5 is a side view partially showing an example of still another embodiment of the spoke structure constituting the non-pneumatic tire of the present invention.
Figure 6:
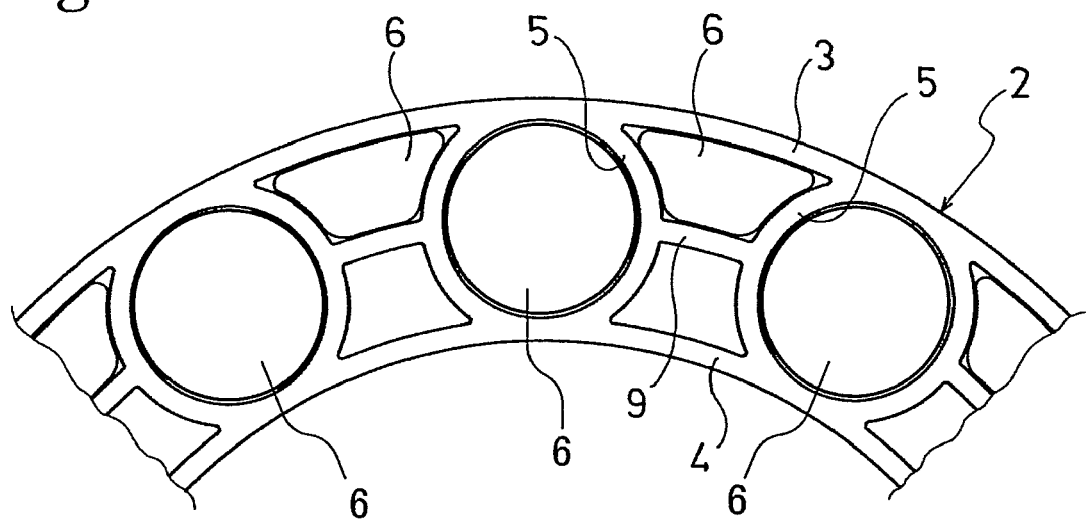
FIG. 6 is a side view partially showing an example of still another embodiment of the spoke structure constituting the non-pneumatic tire of the present invention.

FIGS. 5 and 6 are explanatory views showing other examples of the embodiment shown in FIG. 4. In FIG. 5, the spokes 5 couple the cylindrical outer member 3 and cylindrical inner member 4 together while being bent in the tire circumferential direction, and any two spokes 5, 5 circumferentially adjacent to each other are bent in opposed directions from each other. The coupling portion 9 is formed so as to couple together concave portions of the adjacent spokes 5, 5. By this coupling portion 9, a space between the concave portions of the adjacent spokes 5, 5 is radially divided into a plurality of spaces, and a space radially outermost among the spaces obtained by the division is formed into an air-containing structure by press fitting into this space the elastic bag body 6 having air sealed therein. By thus providing the air-containing space in the radially outermost side, a region, having weak radial rigidity, found in the cylindrical outer member 3 between the spokes 5, 5 can be efficiently reinforced.

In FIG. 6, in addition to the elastic bag bodies 6 shown in FIG. 5, the elastic bag bodies 6 are press fitted into spaces each formed between convex faces of certain two circumferentially adjacent spokes 5, 5. A region, having weak radial rigidity, found in the cylindrical outer member 3 between each two of the spokes can be efficiently reinforced by thus press fitting the elastic bag bodies into all the spaces, formed between every two circumferentially adjacent spokes, located on the inner peripheral side of the cylindrical outer member. Additionally, by reducing differences in rigidity in the tire circumferential direction, vibration and noise when the tire travels are reduced, and ride comfort can be thereby enhanced.

Additionally, it is preferable that the elastic bag body used in the present invention include an air charging and discharging valve. By providing the air charging and discharging valve to the elastic bag body, an air pressure of the air sealed therein can be adjusted in accordance with a size of the elastic bag body and a position where it is arranged. Thereby, differences in rigidity in the tire circumferential direction can be further reduced.

Figure 7:
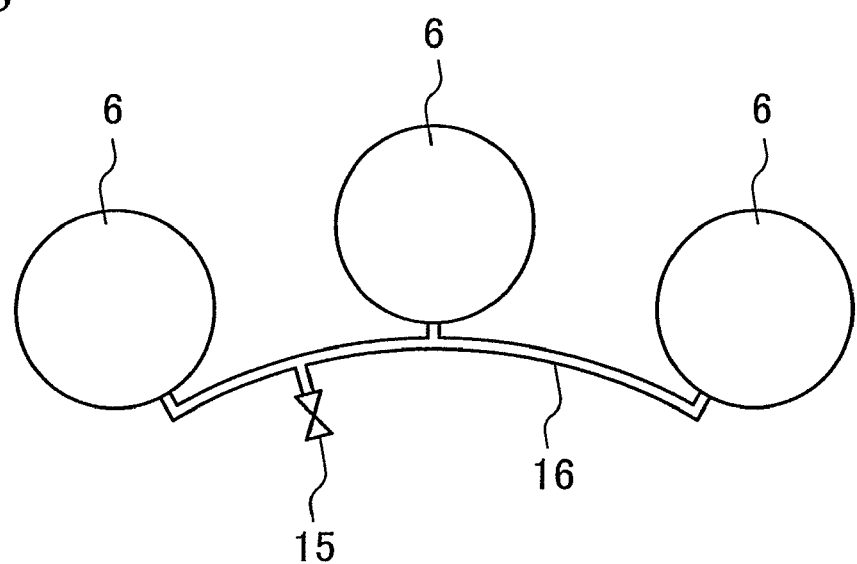
FIG. 7 is a side view schematically showing an example of another embodiment of an elastic bag body constituting the non-pneumatic tire of the present invention.

A manner in which the air charging and discharging valve is provided to the elastic bag bodies is not particularly limited, and one air charging and discharging valve may be provided to each of the elastic bag bodies, or one of the elastic bag bodies to which the air charging and discharging valve is provided may communicate through an air charging and discharging tube with plural ones of the elastic bag bodies, the plural ones being adjacent to the foregoing one. Otherwise, as shown in FIG. 7, while plural ones of the elastic bag bodies 6, which are adjacent to one another, may communicate with one another through an air charging and discharging tube 16, an air charging and discharging valve 15 may be provided to the air charging and discharging tube 16. While the illustrated example is an example where three of the elastic bag bodies 6 are caused to communicate with each other through the air charging and discharging tube 16, the number of the elastic bag bodies 6 communicating with each other is not limited to this, and is applicable as long as the number is plural. Additionally, each of all the elastic bag bodies may communicate with the elastic bag bodies adjacent thereto. Otherwise, with the elastic bag bodies being grouped in accordance with sizes of the elastic bag bodies and positions where they are arranged, the elastic bag bodies in each group may communicate with each other through the air charging and discharging tube, and an air pressure of sealed air may be adjusted through an air charging and discharging valve.

In the present invention, it is preferable that an air pressure in the space containing air be set higher than an atmospheric pressure. By setting the air pressure in the space containing air to a pressure higher than the atmospheric pressure, the contained air is compressed when a load acts upon the cylindrical outer member. Then, the contained air comes to have an even higher pneumatic pressure, and disperses the load by transmitting a pressure evenly in all directions, whereby buckling is prevented from occurring in the cylindrical outer member.

Additionally, although a gauge pressure of the air pressure in the space containing air is not particularly limited, it is preferable that the gauge pressure be preferably set to 10 to 500 kPa, or be more preferably set to 50 to 300 kPa. When the gauge pressure is less than 10 kPa, buckling in the cylindrical outer member cannot be sufficiently suppressed in some cases. In contrast, when the gauge pressure is higher than 500 kPa, strength of the cylindrical outer member and cylindrical inner members, spokes and sealing walls which surround the space containing air must be increased, and, if those members are thickened for this reason, a weight of the pneumatic tire increases. Note that, as the gauge pressure of the space containing air, the pressure at 20° C. is set.

Figure 8:
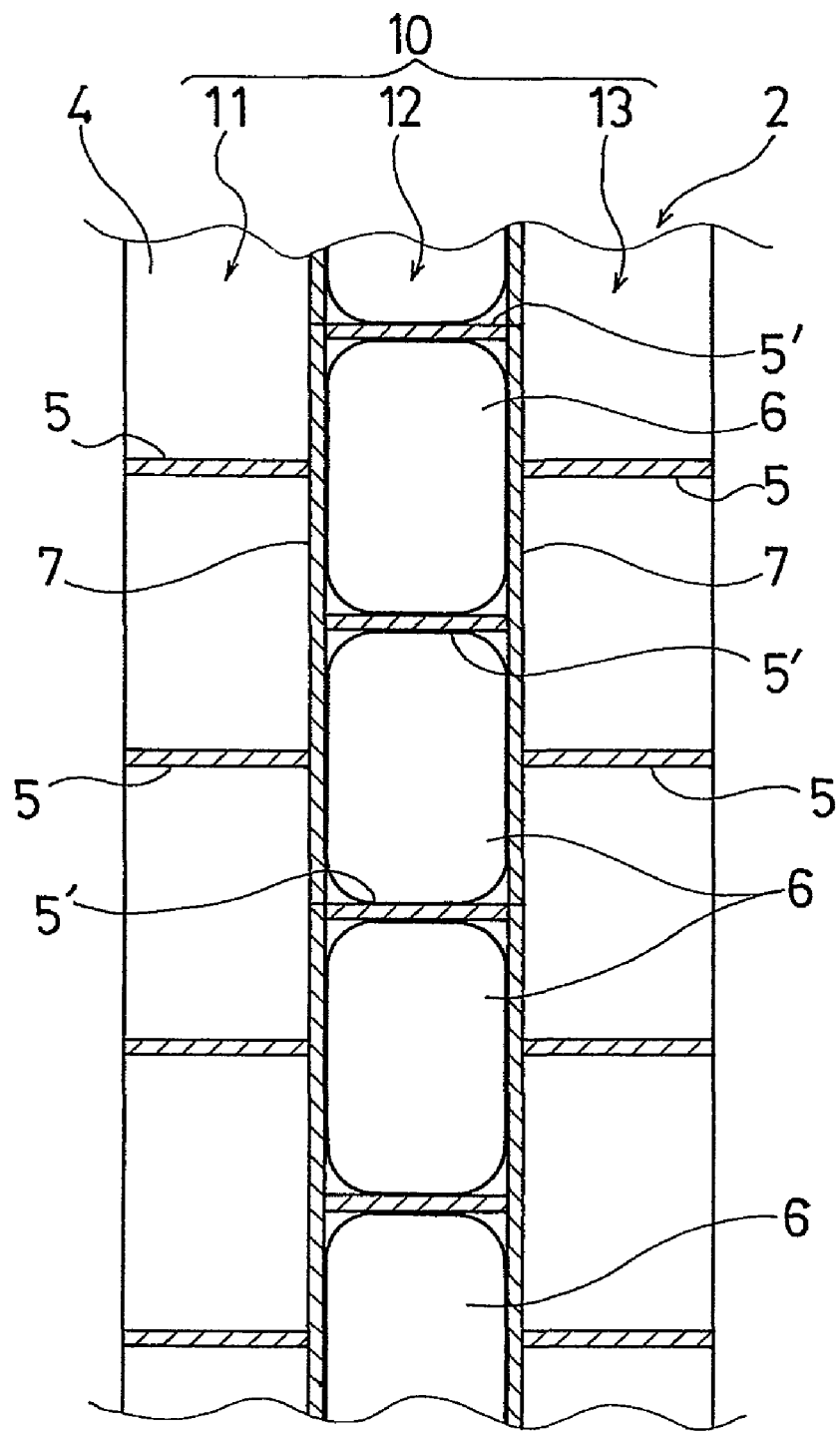
FIG. 8 is an explanatory view, which is equivalent to FIG. 2, showing still another example of the spoke structure constituting the non-pneumatic tire of the present invention.
Figure 9:
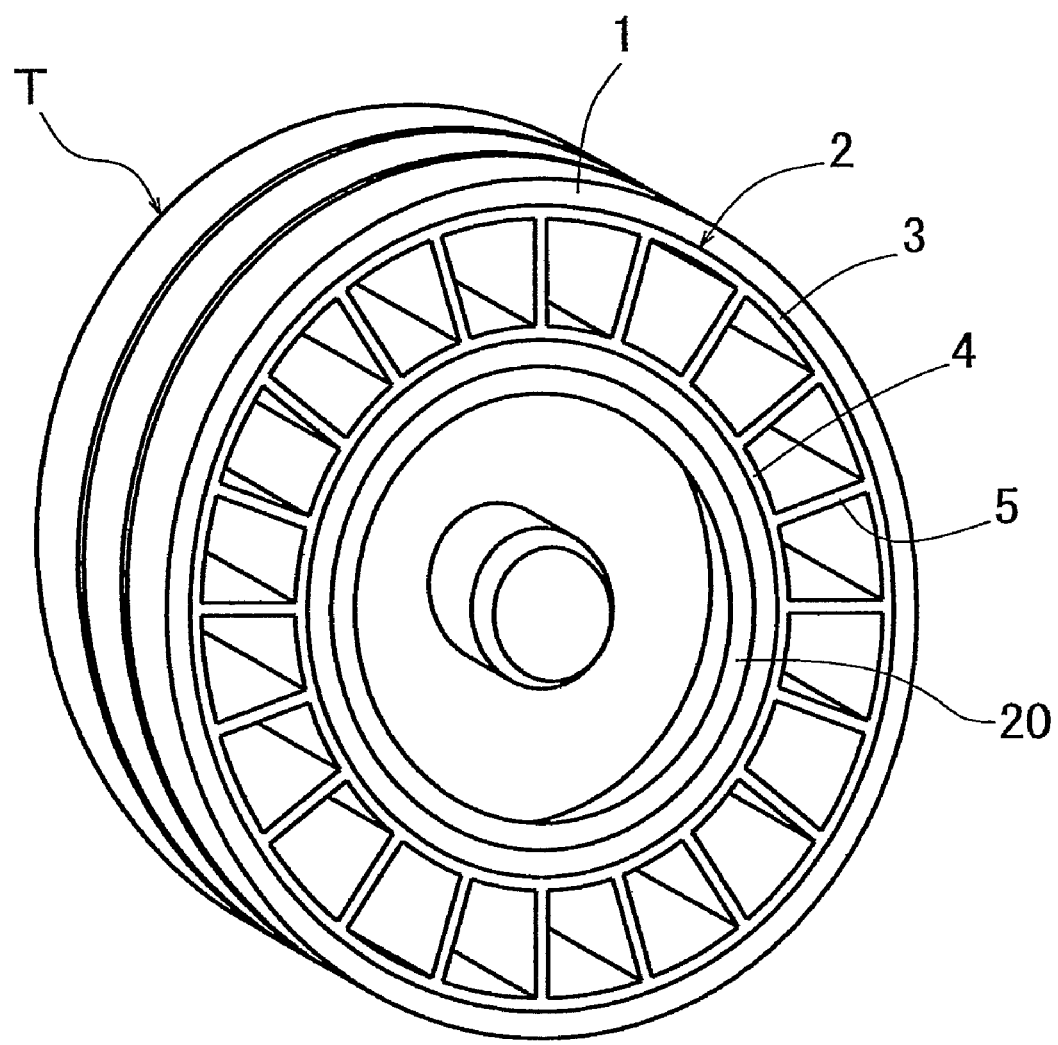
FIG. 9 is a perspective view showing a state where the non-pneumatic tire is mounted on a wheel.

As shown in FIG. 8, a set of spaces in the spoke structure may be formed to have a structure divided into a plurality of zones 10 in the tire width direction. In this case, the spaces in the spoke structure may be formed in a state where the set of spaces are further divided into a plurality of zones in the tire width direction by integrally forming the cylindrical outer member and cylindrical inner member in the tire width direction, and then dividing each of the spokes into a plurality of parts in the tire width direction. Otherwise, the spaces in the spoke structure may be formed in a state where the set of spaces are further divided into a plurality of zones in the tire width direction by forming the cylindrical outer member, cylindrical inner member and spokes in a state they are divided into a plurality of zones 11 to 13 in the tire width direction, then providing air-containing spaces therein, and then integrally bonding the zones 11 to 13 in the tire width direction.

In FIG. 8, in the space corresponding to the spoke structure thus divided in the tire width direction, the plurality of zones are arranged so that a position of one zone thereof can be shifted, in the tire circumferential direction, from a position of another zone adjacent to the one zone. Thereby, with the spokes each being divided into a plurality of parts in the tire width direction, positions of these parts of each spoke can be shifted from each other between adjacent two zones (between the zones 11 and 12, and between the zones 12 and 13) of the plurality of zones. By arranging the spokes so that positions of these parts of each spoke can be shifted from each other between the adjacent zones 11 and 12, a position of spoke 5' in the zone 12 is made contact with a region between the spokes 5, 5 in the zone 11, whereby the spokes 5' in the zone 12 become effective in strengthening rigidity of the cylindrical outer member 3 between each adjacent two of the spokes 5 in the zone 11. At the same time, rigidity of the cylindrical outer member 3 between each adjacent two of the spokes 5', 5' in the zone 12 is strengthened by the spokes 5 in the zone 11. Likewise, rigidity of the cylindrical outer member 3 can be complementarily enhanced also in the adjacent zones 12 and 13. In this manner, circumferential rigidity of the cylindrical outer member 3 in the central zone 12 where buckling is more likely to occur is enhanced by the spokes whose parts therein are arranged so as to be shifted from those in the zones 11 and 13 located to both of the right and left sides thereof. For this reason, buckling in the tread portion supported by the cylindrical outer member 3 can be efficiently prevented.

As a configuration by which positions of the spokes in one of the zones are made circumferentially shifted from those in another one of the zones which is adjacent to the one, any one of the following two configurations can be applied: 1) a configuration where phases of arrangement pitches between adjacent spokes are shifted, and 2) a configuration where distances of arrangement pitches between adjacent spokes (the number of spokes) are made different. Additionally, it is also possible that these configurations are combined for making circumferential positions of the spokes mutually shifted.

Additionally, it is preferable that the space corresponding to the spoke structure be, as shown in FIG. 8, formed into a structure divided into at least three zones 11 to 13 in the tire width direction, and that spaces in at least the center zone 12 in the tire width direction be formed to contain air by press fitting therein the elastic bag body 6. Additionally, the sealing walls 7, 7 may be formed on both sides of the center zone 12 thus having the elastic bag body 6 arranged therein. By thus forming into an air-containing structure the center zone 12 where buckling is more likely to occur, a load acting upon the cylindrical outer member can be efficiently dispersed, whereby buckling can be prevented with weight increase of the tire being suppressed. Note that all of spaces in the widthwise center zone 12 of the tire may have air-containing structures, or at least some of the spaces in the widthwise center zone 12 of the tire may have air-containing structures.

In the present invention, it is preferable that the cylindrical outer member, cylindrical inner member, spokes, sealing walls and coupling portions forming the spoke structure be formed of rubber or resin, rubber or resin covering a code reinforcement material, or the like. Thermosetting resin or cross-linked thermosetting resin is more preferable, and urethane resin is particularly preferable. Additionally, it is preferable that the cross-linked thermosetting resin has a tensile modulus of elasticity being 10 to 70 MPa. If the tensile modulus of elasticity is less than 10 MPa, deformation of the tire when a load acts thereupon becomes large, and it is difficult to secure durability of the tire. On the other hand, if the tensile modulus of elasticity exceeds 70 MPa, ride comfort worsens, and the tire becomes unacceptable as a passenger vehicle tire although durability of the tire can be secured. Materials constituting these members may be the same, or may be different.

The non-pneumatic tire of the present invention can be produced by a usual method. Note that formation of the sealing walls may be sequentially processed in a manner that, after a primary operation for molding and hardening, along with the cylindrical outer member, the cylindrical inner member and spokes, the sealing wall for one of the sides by using urethane resin is performed, a secondary operation for molding and hardening the sealing wall for the other one of the limits is performed.

What is claimed is:

1. A non-pneumatic tire comprising:
   a spoke structure joined to an inner peripheral side of a tread ring, the spoke structure including a cylindrical outer member, a cylindrical inner member spaced coaxially from the cylindrical outer member and spokes arranged intermittently at intervals in a tire circumferential direction so as to couple the cylindrical outer member and the cylindrical inner member to each other, the spoke structure having a first side opposite a second side in a tire width direction, the cylindrical outer member having an outer peripheral side joined to the inner peripheral side of the tread ring; and
   a plurality of spaces each formed between adjacent two of the spokes in the tire circumferential direction and extending continuously from the first side to the second side and having a first opening on the first side with an opening size which is substantially the same as an opening size of a second opening on the second side, the spaces being structured to have further divided spaces in the tire radial direction, at least some of the further divided spaces located outermost in the tire radial direction having an air-containing structure;
   wherein the cylindrical outer member, the cylindrical inner member and the spokes are formed of resin.

2. The non-pneumatic tire according to claim 1, wherein the air-containing structure is obtained by forming sealing walls on the first and second sides of the spaces in the tire width direction.

3. The non-pneumatic tire according to claim 1, wherein the air-containing structure is obtained by press fitting, into each of the some spaces, an elastic bag body having air sealed therein.

4. The non-pneumatic tire according to claim 3, wherein the elastic bag body includes an air charging and discharging valve.

5. The non-pneumatic tire according to claim 4, wherein
   the elastic bag body communicates with another elastic bag body adjacent thereto through an air charging and discharging tube, and
   the air charging and discharging tube is connected with the air charging and discharging valve.

6. The non-pneumatic tire according to claim 3, wherein sealing walls are formed on both sides of the elastic bag body in the tire width direction.

7. The non-pneumatic tire according to claim 6, wherein a cross-sectional height of each of the sealing walls is 30 to 80% of a cross-sectional height of each of the spokes.

8. The non-pneumatic tire according to claim 3, wherein
   the spokes are bent so that resulting concave faces of two spokes can circumferentially face each other, and
   the elastic bag body is press fitted into a space between the two spokes forming these facing concave faces, the two spokes circumferentially forming a pair.

9. The non-pneumatic tire according to claim 1, wherein an air pressure in each of the spaces containing air is set higher than an atmospheric pressure.

10. The non-pneumatic tire according to claim 9, wherein the air pressure in each of the spaces containing air is set to 10 to 500 kPa.

11. The non-pneumatic tire according to claim 3, wherein an air pressure in each of the spaces containing air is set higher than an atmospheric pressure.

12. The non-pneumatic tire according to claim 11, wherein the air pressure in each of the spaces containing air is set to 10 to 500 kPa.

13. A non-pneumatic tire comprising:
a spoke structure joined to an inner peripheral side of a tread ring, the spoke structure including a single cylindrical outer member having a width substantially the same as the tread ring, a single cylindrical inner member having a width substantially the same as the tread ring spaced coaxially from the cylindrical outer member and a plurality of spokes extending in a tire width direction and arranged intermittently at intervals in a tire circumferential direction, and at least two wall members extending in the tire circumferential direction and arranged in the tire width direction to define a plurality of zones extending in the tire circumferential direction, so as to couple the cylindrical outer member and the cylindrical inner member to each other, the cylindrical outer member having an outer peripheral side joined to the inner peripheral side of the tread ring;
a plurality of spaces each formed between adjacent two of the spokes in the tire circumferential direction and between the at least two wall members; and
an air-containing structure provided in the space between the at least two walls.

14. The non-pneumatic tire according to claim 13, wherein
the space between the at least two walls is further divided into a plurality of spaces in the tire circumferential direction, and
a position of the spaces in a zone between the two walls is shifted, in the tire circumferential direction, from a position of the spaces in another zone thereof adjacent to the zone between the two walls.

15. The non-pneumatic tire according to claim 14, wherein
the spoke structure is divided into three zones, and at least one space in a center zone has the air-containing structures.

* * * * *